US009805767B1

(12) United States Patent
Strickland

(10) Patent No.: US 9,805,767 B1
(45) Date of Patent: Oct. 31, 2017

(54) PERSPECTIVE VIEW ENTERTAINMENT SYSTEM AND METHOD

(71) Applicant: Michael Shane Strickland, Scottsboro, AL (US)

(72) Inventor: Michael Shane Strickland, Scottsboro, AL (US)

(*) Notice: Subject to any disclaimer, the term of this patent is extended or adjusted under 35 U.S.C. 154(b) by 0 days.

(21) Appl. No.: 15/236,997

(22) Filed: Aug. 15, 2016

Related U.S. Application Data

(60) Provisional application No. 62/204,564, filed on Aug. 13, 2015.

(51) Int. Cl.
| | |
|---|---|
| *H04N 5/77* | (2006.01) |
| *H04N 5/76* | (2006.01) |
| *G11B 27/32* | (2006.01) |
| *G11B 31/00* | (2006.01) |
| *H04N 21/43* | (2011.01) |
| *H04N 21/218* | (2011.01) |
| *H04N 21/4223* | (2011.01) |
| *H04N 21/8545* | (2011.01) |
| *H04N 21/4402* | (2011.01) |

(52) U.S. Cl.
CPC .......... *G11B 27/32* (2013.01); *G11B 31/006* (2013.01); *H04N 5/77* (2013.01); *H04N 21/21805* (2013.01); *H04N 21/4223* (2013.01); *H04N 21/4307* (2013.01); *H04N 21/44029* (2013.01); *H04N 21/8545* (2013.01)

(58) Field of Classification Search
CPC ........ G11B 27/32; G11B 31/006; H04N 5/77; H04N 21/4307; H04N 21/21805; H04N 21/4223; H04N 21/8545; H04N 21/44029

USPC ................ 386/219, 223, 224, 230, 248, 341
See application file for complete search history.

(56) References Cited

U.S. PATENT DOCUMENTS

| | | | | |
|---|---|---|---|---|
| 6,289,165 B1* | 9/2001 | Abecassis | .............. | G11B 19/02 348/E5.105 |
| 2009/0176570 A1* | 7/2009 | Baldwin, III | ........... | A63F 13/10 463/33 |
| 2012/0214591 A1* | 8/2012 | Ito | ....................... | A63F 13/5255 463/31 |

(Continued)

*Primary Examiner* — Robert Chevalier
(74) *Attorney, Agent, or Firm* — Angela Holt; Bradlay Arant Boult Cummings LLP

(57) ABSTRACT

In a method according to the present disclosure, a director's view version of a film is recorded. Then the film is recorded from the viewpoint of a different characters in the film. The director's view version and character view versions are time synched to create a film that allows a user to switch at any time between the director's view version and one or more of the character view versions during viewing of the film. A system according to the method uses a director's view camera and at least one character view camera to record a scene. A recording processor communicates with the cameras and receives and stores in memory director's view camera data and character view camera data. The recording processor further time-synchs the director's view camera data and character view camera data. A viewing system has a viewing screen, a viewer-operated controller, and a viewing processor configured to display on the viewing screen at least one of the perspective views of the film scene and to switch between the perspective views of the film scene upon actuation by the viewer of the viewer-operated controller.

19 Claims, 5 Drawing Sheets

(56) References Cited

U.S. PATENT DOCUMENTS

2015/0350628 A1* 12/2015 Sanders .................. G06T 15/08
345/419

* cited by examiner

PERSPECTIVE VIEW ENTERTAINMENT SYSTEM AND METHOD

REFERENCE TO RELATED APPLICATIONS

This application claims the benefit of and priority to Provisional Patent Application U.S. Ser. No. 62/204,564, entitled "Perspective View Entertainment System" and filed on Aug. 13, 2015, which is fully incorporated herein by reference.

BACKGROUND AND SUMMARY

Considered broadly, entertainment, whether pre-recorded or live, is designed to be observed from a single perspective. One or more actors (people, animals, machines, animated characters, etc.) are placed into a setting where they convey the story by producing sound, motion, smells, and possibly other sensations. The audience experiences the story by sensing these sensations from an outside, detached, perspective. An exception to the "outside perspective" is first-person video games that allow the user to experience the sensations first hand, from the perspective of the main game character.

For stage productions, the director carefully chooses the set configuration and actor positions that best convey the story to an audience that views the production from a single perspective (except for slight variations due to audience seating position). In such a system, the audience is limited to experiencing the story from a third-person, outside perspective. Furthermore, the audience cannot know the inner thoughts or motivations of the characters in a stage production, since these are necessarily private to the characters and, thus, hidden from the audience.

For film (including video, animation, etc.), the director decides the final audience perspective by selecting a single camera position, though the camera may be moved, using cuts, fades, and other devices, throughout the telling of the story. Unlike live stage productions, the film director has, therefore, the ability to move the observer's viewpoint at any time throughout the production to enhance the immersion of the final viewer. For example, during a conversation between two actors, the camera may constantly cut (switch) between actor perspectives, usually positioning the viewpoint roughly at the position of the listener, so that the speaker appears to be speaking to the viewer. Though these techniques help to immerse the viewer into the story, the viewer is limited, as with stage productions, to experiencing only what can be sensed through sight and sound, and not to the inner thoughts and motivations of the characters.

For first person video games, the virtual camera is usually attached to the main character, so that the viewer maintains the perspective of the main character. For this reason, first person video games may be considered the most immersive of the described forms of entertainment. However, one of the shortcomings of first person perspective is that the story cannot include any elements that are unobserved by the main character. Simultaneous events occurring at spatially distant locations are not known to the viewer. This limitation makes the first person perspective a poor choice for conveying complex story lines with parallel action.

The system and method according to the present disclosure is a multiple viewpoint entertainment system that allows audiences to experience a pre-recorded or live production from any one of multiple perspectives. The viewers are allowed to change available perspective views at any time. The concept of multiple viewpoints is made possible by introducing sensors, such as camera and sound sensing devices, to multiple actors during the production and then delivering the recorded or live results to audience members who have a choice of perspectives.

In the system according to the present disclosure, actors, live or computer-generated, whose viewpoints are to be made available to audience viewers are selected prior to production. Sensor devices, such as a camera and microphone, are attached to or associated with the selected actors or actor positions. When the actor appears in the production, the scene is then captured from that actor's perspective. In cases where multiple actors are in a scene, the scene may be captured from all available perspectives. A "director's view" perspective is a perspective view and is analogous to the previous notion of the film camera.

According to one aspect of the present disclosure, though the sensor devices associated with a given actor would normally be physically attached to the actor, they could also be positioned near to the actor. For example, in cases where the sensor devices would be visible, distracting, or otherwise interfere with the production, the sensor devices could be located proximally to the actor using stand-off sensors that approximate the actor's perspective.

According to another aspect of the present disclosure, in the case of live entertainment such as stage plays, each actor may be equipped with cameras that record that actor's viewpoint, which is then transmitted live to the audience. For recorded productions, the recordings would be stored for post-production using traditional techniques. Each individual actor's recorded views could be optionally enhanced by adding audible "inner thoughts," adding audio that would only be detected by the actor (for example, from an earphone or headset), processing the sound using effects processors, adding closed-captioning text, or otherwise modifying or augmenting the sensor output. These modifications and additions would be used to further enhance the immersive aspect of the production, and to provide additional information otherwise unknown to the general, third-person, observer.

In the system of the present disclosure, the captured data from each actor would be collected into "perspective view streams" which would then be collected centrally and then made available to audience members, individually or collectively. One method would be to equip each audience member with a virtual reality (VR) device or viewing station that includes video and headphones, enabling the audience member to receive a selected perspective view stream. Another method would be to partition the audience and select a unique perspective stream for each partition. In either method, the stream could be optionally switched dynamically between the available view streams.

According to another aspect of the present disclosure, the above VR device or viewing station would be connected to the viewing system using a wired or wireless connection, allowing real-time transmission of one or more perspective view streams and other information. Wireless techniques would include radio frequency (RF) equipment including a custom transceiver or standard Wireless Local Area Network (WLAN) capabilities (e.g. 802.11n), or WiFi.

Another capability facilitated by the present disclosure would allow the above VR device or viewing station to be optionally equipped with user accessible controls including audio volume and closed captioning for the hearing impaired, video brightness for the visually impaired, alternate language subtitles or another language, buttons or knobs for ratings or other real-time feedback. In cases where all audience members are equipped with a VR device or viewing station, the need for a traditional theater would be eliminated, possibly reducing the cost of such a venue.

According to one embodiment of the present disclosure, optical discs (e.g. DVD and Blu-ray) or digital downloads for home entertainment markets would also be used to store multiple perspective view streams, taking advantage of existing disc/digital capabilities for multiple tracks and camera angles. For home systems possessing the required interfacing capability, the VR device or viewing station would be attachable to such systems, allowing the same in-venue experience in a home setting.

According to another embodiment of the present disclosure, venues could be further augmented to introduce olfactory (smell) stimulation, seat motion, temperature variations, other peripherals, and other sensations.

DETAILED DESCRIPTION

Figure 1:
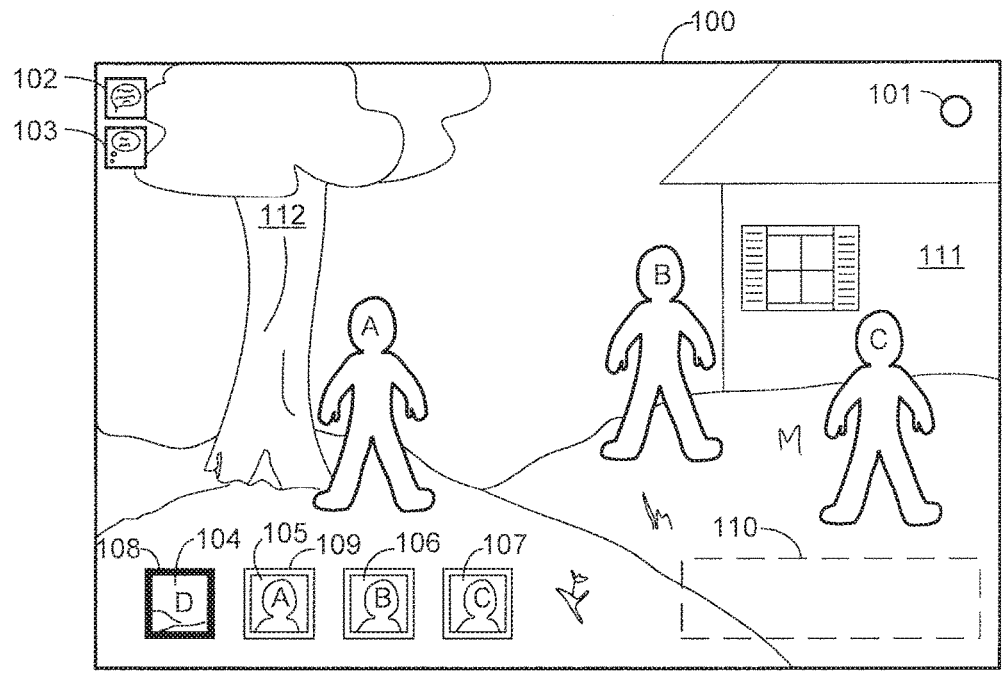
FIG. 1 depicts a viewing screen according to an exemplary embodiment of the present disclosure.

FIG. 1 depicts a viewing screen 100 according to an exemplary embodiment of the present disclosure. The viewing screen 100 depicts a scene in a film, as directed by a director (not shown) and filmed by a crew (not shown). The exemplary screen 100 depicts a "director's view." i.e., the scene as envisioned by the director for viewing. Characters "A", "B." and "C" appear on the screen 100, along with a house 111 and a tree 112. In a system according to the present disclosure, a viewer (not shown) of the screen 100 is able to switch between this director's view to first-person viewpoints of the characters A, B and C.

In this regard, a plurality of perspective icons 104-107 at the bottom left of the screen 100 indicate what view the viewer is watching. The viewer is watching the director's view when perspective icon 104 is indicated as selected. In the illustrated embodiment, a border 108 around the perspective icon 104 is shown in heavy black line to indicate that the director's view is being seen. In other embodiments, the border 108 may be differently colored, highlighted, or the perspective icon 104 is otherwise in some manner made more prominent than the other perspective icons 105-107. The term "highlighted" is used herein with respect to differentiating a border on a perspective icon in some way discernable to the viewer.

In one embodiment, a border 109 on character A's perspective icon, for example, turns red to indicate a thirty (30) second warning that the character will be leaving the scene. If the character's view is still active at the end of the countdown, the scene will automatically switch to the director's view. A new character icon (not shown) may show up with a green border (not shown) to indicate that the new character will appear on the scene within thirty (30) seconds. If a viewer selects this character, the scene will automatically switch to the new character's perspective at the end of the thirty seconds, when the new character appears in the scene.

The perspective icon 105 indicates that character A's viewpoint can be selected for viewing. In this regard, the same scene depicted in the director's view of the screen 100 has been filmed from character A's perspective (i.e., a camera in the position of the actor playing character A has filmed the same scene), and the scene from character A's perspective has been time-synched with the director's view. A viewer can switch at any time from the director's view to character A's view, and the scene will immediately change to character A's perspective. When character A's perspective is being viewed, the perspective icon 105 is highlighted, and the perspective icon 104 is not highlighted.

Similarly, the perspective icon 106 indicates that character B's viewpoint can be selected for viewing. The same scene depicted in the director's view of the screen 100 and in character A's perspective has also been filmed from character B's perspective, and the scene from character B's perspective has been time-synched with the other scenes. A viewer can switch at any time from the director's view or character A's view to character B's view, and the scene will immediately change to character B's perspective. When character B's perspective is being viewed, the perspective icon 106 is highlighted, and the other perspective icons 104 and 105 are not highlighted.

Similarly, the perspective icon 107 indicates that character C's viewpoint can be selected for viewing. The same scene depicted in the director's view of the screen 100, character A's perspective, and character B's perspective, has also been filmed from character C's perspective, and the scene from character C's perspective has been time-synched with the other scenes. A viewer can switch at any time from the director's view, character A's view, or character B's view, to character C's view, and the scene will immediately change to character C's perspective. When character C's perspective is being viewed, the perspective icon 107 is highlighted, and the other perspective icons 104, 105 and 106 are not highlighted.

Although FIG. 1 depicts one director's view perspective icon 104, one character A perspective icon 105, one character B perspective icon 106, and one character C perspective icon 107, there may be more or fewer perspective icons to choose from in any given scene in any given film. Further, the number of perspective icons 104-107 will likely change many times during a film. For example, when a character leaves a scene, that character's icon will disappear. When a new character enters a scene that character's icon may appear. Not all character viewpoints may be available for perspective viewing. A viewer can select between any character icon on the screen 100 at any time to immediately switch to that perspective view. The only perspective icon that is always available is the director's view icon 104, because if there is any scene, there will generally always be a director's view of it.

In the illustrated embodiment, the exemplary screen 100 further comprises a character talking icon 102 and a character thinking icon 103. The character talking icon 102 pops up on the screen 100 to indicate that a character whose view the viewer is watching is talking. A character thinking icon 103 pops up on the screen 100 to indicate that a character whose view the viewer is watching is thinking, while audio may play the character's thoughts. Other embodiments of the screen 100 may not include the character talking icon 102 and character thinking icon 103.

The screen 100 further comprises a character change alert indicator 101 that pops up on the screen 100 to indicate a character change. For example, if a viewer is viewing from character A's perspective, and character A will shortly leave the scene, a red change alert indicator 101 may pop up on the screen and blink for thirty seconds or to indicate that the viewer will need to change perspective views soon. If the viewer does not change perspective views before character A exits the scene, the screen will revert to the director's view.

Further, if a new character is about to enter the scene, a green change alert indicator 101 may pop up on the screen and blink to indicate that a new character view will soon be available. When the new character actually enters the scene, a perspective icon for the new character will pop up to indicate that the new character's perspective view is now selectable by the viewer.

In the illustrated embodiment, the screen 100 further comprises a message area 110 that may be used to display text to the viewer. The text could be anything desired to be communicated to the viewer by a movie theater, for example. Or, in other embodiments, the text could be messaging between multiple viewers.

Figure 2:
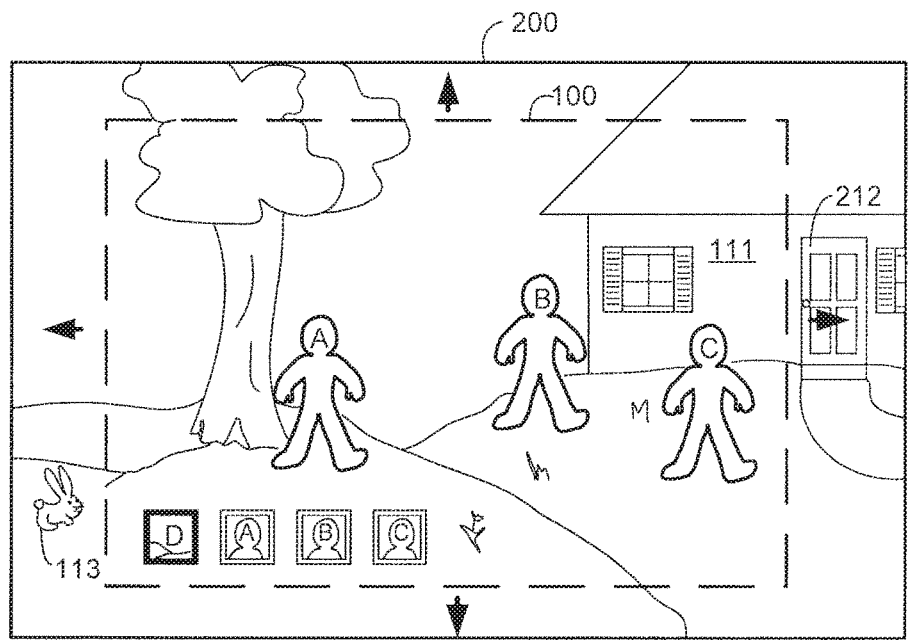
FIG. 2 depicts the viewing screen of FIG. 1, shown within a larger raw footage area viewable by the viewer.

FIG. 2 depicts the screen 100 of FIG. 1, shown within a larger raw footage area 200. In this regard, the scene may be shot with a larger field of view that is shown on the screen 100, to allow viewers to "look around" a scene. For example, a viewer may be watching via a headset with an integral viewing screen, and the headset would allow the viewer to turn their head to see additional portions of the scene not in the original view. In the scene depicted in FIG. 2, for example, if a viewer "looks" to the right, the viewer could see a door 212 of the house 111, the door not visible in the original screen 100. If the viewer looks left, the viewer could see a rabbit 113 that was not visible in the original screen. In this manner, the viewer can discover additional information about a scene by exploring beyond the original screen frame. When a viewer is watching on a fixed screen instead of with a VR headset, the viewer may look around a scene by actuating arrows on a keyboard or remote control device, for example.

Further, the scene may be filmed with 360 degree cameras, from the director's view and/or any character views. In such a case, the viewer can look around 360 degrees to explore the scene.

Figure 3:
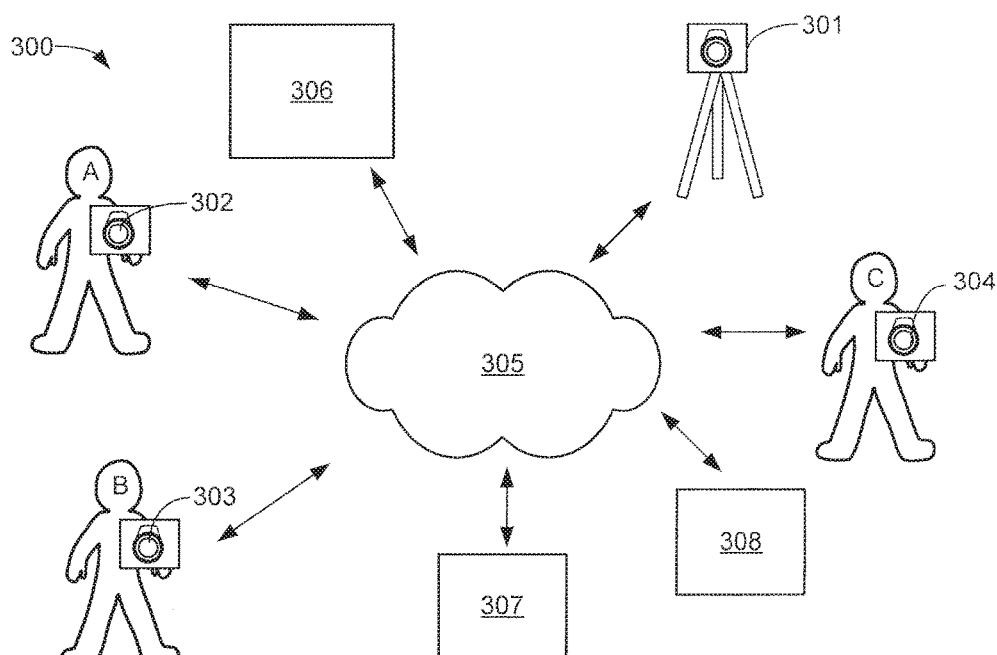
FIG. 3 depicts a perspective view recording system according to an exemplary embodiment of the present disclosure.

FIG. 3 depicts a perspective view recording system 300 according to an exemplary embodiment of the present disclosure. The exemplary recording system 300 comprises a director's view camera 301, which records a scene (not shown) from the director's preferred view. i.e., similar to a traditional film. The recording system 300 further comprises a character A camera 302, which is a camera recording from the viewpoint of character A. The camera 302 may comprise a "hidden" camera and audio device worn by an actor portraying character A, or may be a camera held by a camera operator recording the viewpoint that character A would experience, or may be a remote control camera.

The recording system 300 further comprises a character B camera 303, which is a camera recording from the viewpoint of character B. The camera 303 is substantially similar to the camera 302. The recording system 300 further comprises a character C camera 304, which is a camera recording from the viewpoint of character C. The camera 304 is substantially similar to the cameras 302 and 303.

Any or all of the cameras 301-304 may be 360 degree view cameras. Further, although the system 300 of FIG. 3 depicts one director's camera 301, one character A camera 302, one character B camera 303 and one character C camera 304, in other embodiments, and in other scenes, there may be more or fewer cameras 302-304.

The cameras 301-304 send video and audio data to a processor 306 across a network 305. (Although audio recording devices are not shown in FIG. 3, as known by persons with skill in the art of filmmaking, audio may be recorded in a scene, and/or dubbed in during post-processing.) The processor 306 receives the video and audio data and time-synchs the character view data and the director's view data, as further discussed herein. The processor 306 is further discussed with respect to FIG. 4 herein.

The network 305 may be of any type network or networks known in the art or future-developed, such as the internet backbone, Ethernet, Wifi, WiMax, broadband over power line, coaxial cable, and the like. The network 305 may be any combination of hardware, software, or both.

In the illustrated embodiment, the recording system 300 further comprises a device stream 307. The device stream 307 comprises instructions for actuating peripheral sensor devices that will be actuated during viewing of the film. Exemplary peripheral sensor devices include motion control devices, which may be a chair or platform that vibrates or moves to simulate motion. Exemplary peripheral sensor devices further comprise wearable sensor devices worn by the viewer, such as a pressure vest with inflatable pockets that can inflate and deflate to induce sensations upon the viewer during the film. Exemplary peripheral sensor devices further comprise temperature controlling devices to raise or lower the temperature during certain scenes. Exemplary peripheral sensor devices further comprise wind generating devices which may blow air (of varying temperatures) on the viewer during viewing of a scene.

In the illustrated embodiment, the recording system 300 further comprises an informational stream 308. The informational stream 308 comprises information from various sources for commentary to the viewer, via display in the message area 110 (FIG. 1) on the screen 100 (FIG. 1) or for communication between viewers or for recommended viewing options at various points of the recorded or live streams.

Figure 4:
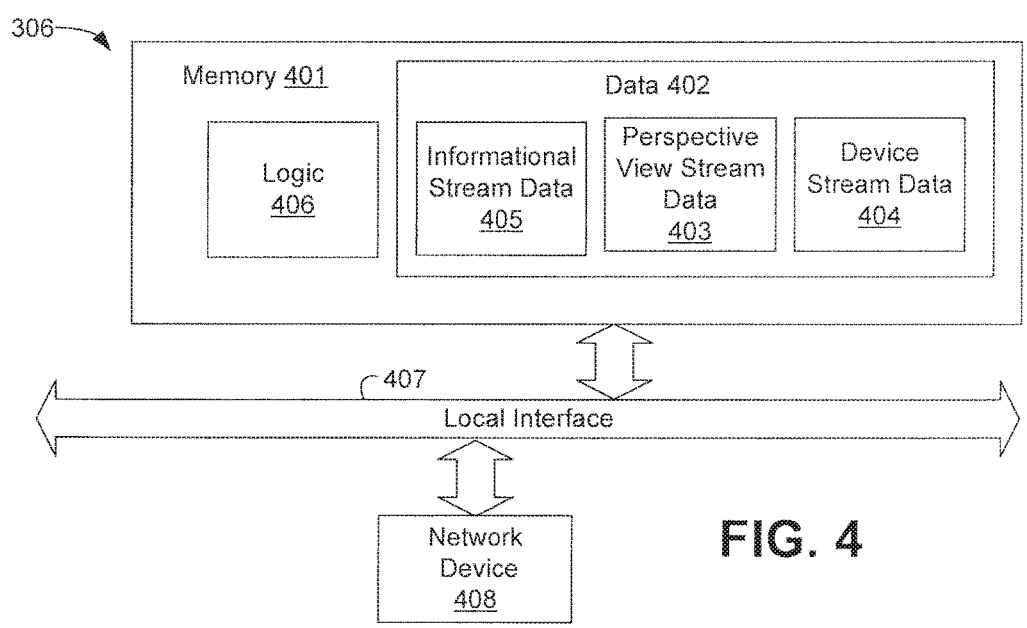
FIG. 4 depicts an exemplary recording system processor according to an embodiment of the present disclosure.

FIG. 4 depicts an exemplary recording system processor 306 according to an embodiment of the present disclosure. The processor 306 comprises logic 406 and data 402. In the exemplary processor 306, logic 406 and data 402 are shown as stored in memory 401. The logic 406 and data 402 may be implemented in hardware, software, or a combination of hardware and software.

The data 402 comprises informational stream data 405, perspective view stream data 403, and device stream data 404. The informational stream data 405 comprises data from the informational stream 308 (FIG. 3). Perspective view stream data 403 comprises video (and audio) data from the director's view and character views recorded. Device stream data 404 comprises data from the device stream 307 (FIG. 3).

The processor 306 comprises a digital processor or other type of circuitry configured to run logic 406 by processing and executing the instructions of the logic 406. The processor 306 communicates to and drives the other elements within the processor 306 via a local interface 407, which can include one or more buses. A network device 408, for example, a universal serial bus (USB) port or other type network device connects the processor 306 with the network 305 (FIG. 3) for communication with other network devices, if applicable.

Figure 5:
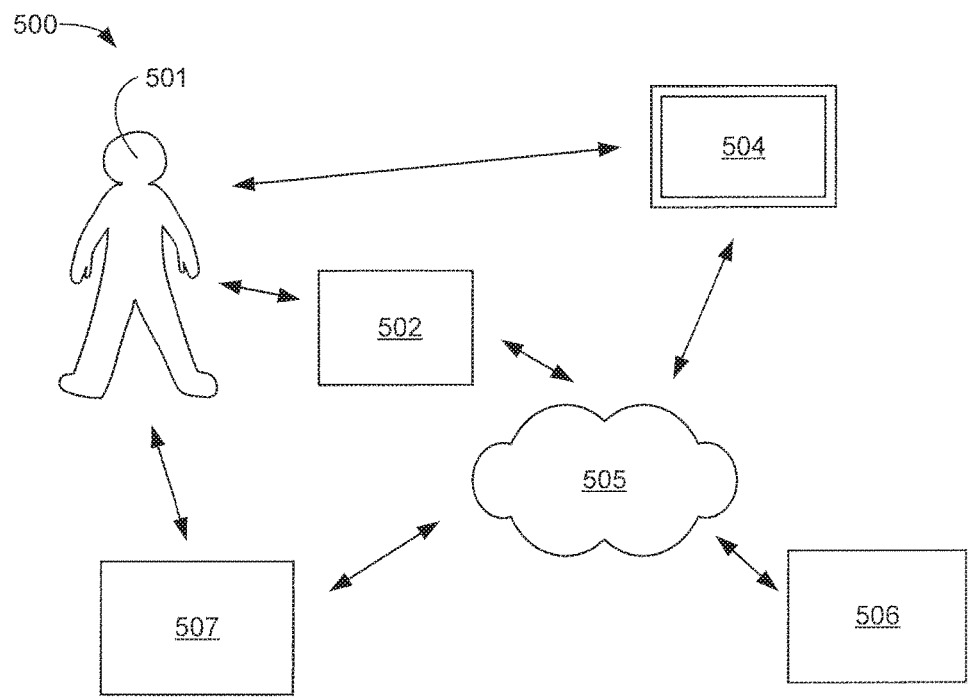
FIG. 5 depicts a perspective view viewing system according to an exemplary embodiment of the present disclosure.

FIG. 5 depicts a perspective view viewing system 500 according to an exemplary embodiment of the present disclosure. The viewing system comprises a viewing screen 504 viewable by a viewer 501. The viewing screen may comprise a virtual reality (VR) headset, a television screen, a computer screen, a hand-held device screen, a movie theater screen, and the other types of viewing displays.

The viewing system 500 further comprises a remote control device 502 that the viewer 501 may use to switch between perspective views on the screen 504, as discussed herein. The viewing system 500 further may comprise one or more peripheral sensory devices 507. The peripheral sensory devices 507 may comprise temperature control devices, wind control devices, scent-producing devices, motion control devices, pressure garments wearable by the viewer, and the like.

The viewing system 500 further comprises a controller 506 that communicates with the screen 504, remote control device 502, and peripheral sensory devices 507 over a network 505. The network 505 may be of any type network or networks known in the art or future-developed, such as the internet backbone, Ethernet, Wifi, WiMax, broadband over power line, coaxial cable, and the like. The network 505 may be any combination of hardware, software, or both.

Figure 6:
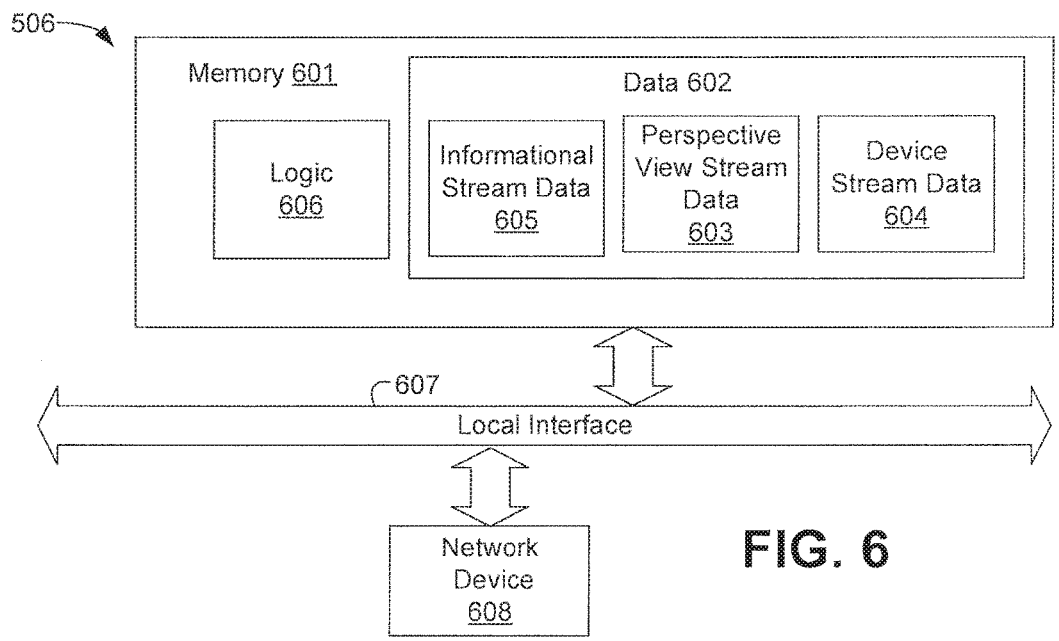
FIG. 6 depicts an exemplary viewing system processor according to an embodiment of the present disclosure.

FIG. 6 depicts an exemplary viewing system processor 506 according to an embodiment of the present disclosure. The processor 506 comprises logic 606 and data 602. In the exemplary processor 506, logic 606 and data 602 are shown as stored in memory 601. The logic 606 and data 602 may be implemented in hardware, software, or a combination of hardware and software.

The data 602 comprises informational stream data 605, perspective view stream data 603, and device stream data 604. The informational stream data 605 comprises data from the informational stream 308 (FIG. 3) that has been modified as necessary from the informational steam data 405 (FIG. 4) for viewing. Perspective view stream data 603 comprises video (and audio) data from the director's view and character views recorded by the recording system 300, time-synched, and modified in post-processing as desired by the director (not shown). Device stream data 604 comprises data from the device stream 307 (FIG. 3) that has been modified as necessary from the device stream data 404 (FIG. 4) to actuate peripheral sensory devices 507 (FIG. 5).

The processor 506 comprises a digital processor or other type of circuitry configured to run logic 606 by processing and executing the instructions of the logic 606. The processor 506 communicates to and drives the other elements within the processor 506 via a local interface 607, which can include one or more buses. A network device 608, for example, a universal serial bus (USB) port or other type network device connects the processor 506 with the network 505 (FIG. 5) for communication with other network devices, if applicable.

Figure 7:
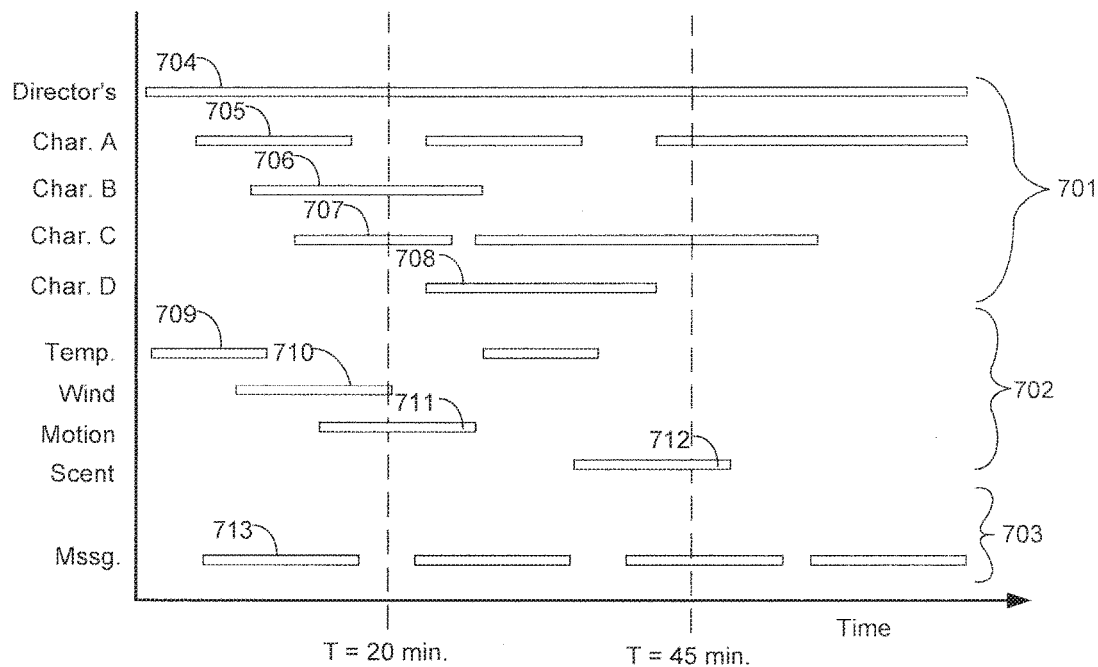
FIG. 7 illustrates time-synched perspective view data streams, peripheral sensory device data streams, and informational data streams according to an exemplary embodiment of the present disclosure.

FIG. 7 illustrates time-synched perspective view data streams 701, peripheral sensory device data streams 702, and informational data streams 703 according to an exemplary embodiment of the present disclosure. The perspective view data streams 701 comprise the director's view data stream 704, which is shown as constant over time because the director's view is always available for viewing. The perspective view data streams 701 further comprise character A data stream 705, character B data stream 706, character C data stream 707, and character D data stream 708. A time=20 minutes as shown in FIG. 7, the director's view, character B and character C are the available perspective view streams 701. Therefore, the viewer can at time 20 minutes select between the director's view stream 704, the character B data stream 706, and the character C data stream 707. Character A and character D are not on screen at time 20 minutes. At time 45 minutes in the film, the viewer can choose between the director's view, character A, and character C as shown.

In the example illustrated in FIG. 7, the peripheral sensory device data streams 702 comprise temperature data 709, wind change data 710, motion data 711, and scent data 712. At time twenty minutes, the viewer would experience wind 710 and motion 711, but not additional temperature stimuli or scent. At time 45 minutes, however, the viewer would experience scent when scent data 712 causes a scent generation device (not shown) to release scent.

The informational data streams 703 comprise messages 713 displayed to the viewer as previously discussed herein. The perspective view streams 701, peripheral sensory device data streams 702, and information data streams 703 are all time-synched together to add to the viewer's viewing experience.

Figure 8:
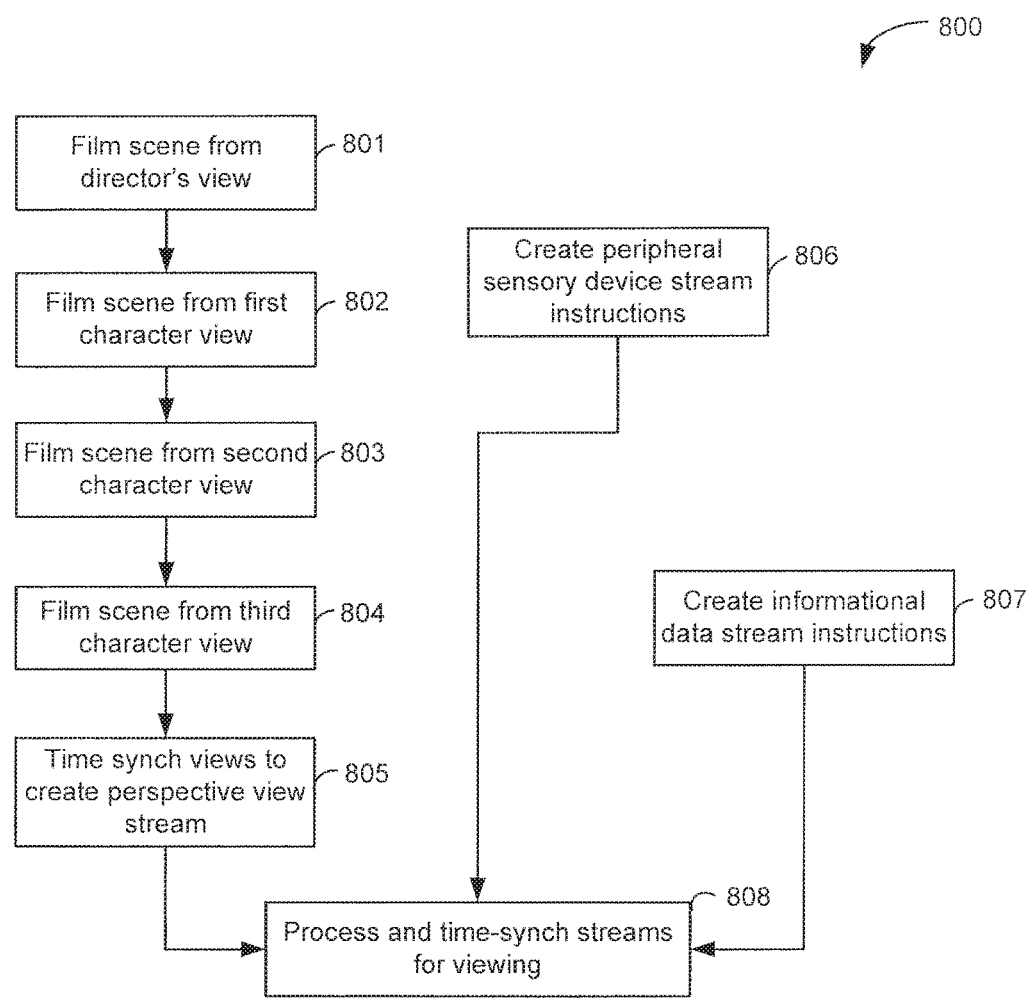
FIG. 8 depicts an exemplary method for creating a perspective view film according to an embodiment of the present disclosure.

FIG. 8 depicts an exemplary method 800 for creating a perspective view film according to an embodiment of the present disclosure. In step 801, a scene is filmed from a director's view, as previously discussed herein. In step 802, the same scene is filmed from the viewpoint of a first character. In step 803, the same scene is filmed from the viewpoint of a second character. In step 804, the same scene is filmed from the viewpoint of a third character. In step 805, the director's view cut of the scene and the cuts filmed from the perspective of the first, second and third characters are time-synched to create a perspective view data stream.

In step 806 of the method 800, instructions are created for operating peripheral sensory devices as previously discussed herein, to create a peripheral sensory device data stream. In step 807 of the method 800, instructions for displaying messages are created as previously discussed herein, to create an informational data stream. In step 808 of the method, the perspective view data stream, peripheral sensory device data stream, and informational data streams are time-synched and processed to create a finished perspective view film.

In one exemplary embodiment, the system creates "log" files for each viewing by monitoring and recording time synched data for each and every action taken by the viewer. For every action taken through the available options presented, the action is noted, time stamped and recorded (i.e. character change from Bob to Mary at time 01:23:45) to the log files. When the viewing is stopped by the viewer or comes to the end of the recording, the log files are saved and archived for statistical, preferential, viewer feedback, and other data interests.

In another exemplary embodiment, the viewing system provides additional audio and/or visual content for the impaired viewers. Visually impaired viewers can get additional audio content for descriptive scenes and audio impaired viewers can select additional video content (such as a strobe flash at the edge of a screen indicating a loud noise outside the current field of view) so the viewer can turn to the direction of the sound.

What is claimed is:

1. A perspective view entertainment system comprising a recording system and a viewing system, the recording system comprising:

a director's view camera;
at least one character view camera;
a recording processor communicating with the director's view camera and the at least one character view camera, the recording processor comprising memory, the recording processor configured to receive and store in the memory director's view camera data and character view camera data, the recording processor further configured to time-synch the director's view camera data and character view camera data;
the viewing system comprising:
a viewing screen;
a viewer-operated controller;
a viewing processor configured to display on the viewing screen, upon actuation by the viewer of the viewer-operated controller, at least one of a plurality of perspective views of a film scene, the perspective views comprising at least a director's view and one or more character views, the perspective views time-synched together, the viewing processor further configured to switch between the perspective views of the film scene upon actuation by the viewer of the viewer-operated controller.

2. The perspective view entertainment system of claim 1, wherein the recording processor is further configured to receive and record in memory peripheral sensory device stream instructions, and wherein the viewing processor is further configured to carry out the peripheral sensory device stream instructions, the peripheral sensory device stream instructions comprising instructions to actuate peripheral sensory devices.

3. The perspective view film viewing system of claim 1, wherein the recording processor is further configured to receive and record in memory informational stream instructions, and wherein the viewing processor is further configured to carry out the informational stream instructions, the informational stream instructions comprising messages for display in a message area on the viewing screen.

4. The perspective view film viewing system of claim 1, wherein the viewing screen comprises a plurality of character icons, the character icons comprising a director's view icon and an icon for every character view available for viewing by the viewer at a current viewing time.

5. The perspective view film viewing system of claim 4, wherein a border around the character icons indicates which of the plurality of characters a viewer is viewing at the current viewing time.

6. The perspective view film viewing system of claim 1, wherein the viewing screen further comprise a character talking icon that is visible on the screen when a character whose perspective view the viewer is currently watching is talking.

7. The perspective view film viewing system of claim 1, wherein the viewing screen further comprises a character thinking icon that is visible on the screen when a character whose perspective view the viewer is currently watching is thinking.

8. The perspective view film viewing system of claim 1, wherein the viewing screen further comprises a character change alert indicator that becomes visible on the screen to indicate an imminent character change.

9. A method of recording and viewing a film with selectable character views, the method comprising:
recording a director's view version of the film;
recording one or more character view versions of the film, the character view versions filmed from the perspective of one or more characters in the film;
time-synching the director's view version of the film with the one or more character view versions of the film and to create a perspective view film, the perspective view film allowing a user to switch at any time between the director's view version and one or more of the character view versions during viewing of the film.

10. The method of claim 9, further comprising recording peripheral sensory device stream instructions, the peripheral sensory device stream instructions comprising instructions to actuate peripheral sensory devices, and actuating one or more peripheral sensory devices during viewing of the perspective view film.

11. The method of claim 9, further comprising informational stream instructions, the informational stream instructions comprising messages for display in a message area on the viewing screen, and carrying out the informational stream instructions during viewing of the perspective view film.

12. A method of recording and viewing a film with selectable character views, the method comprising:
recording a director's view version of the film and generating a director's view data stream;
recording scenes in the film from the viewpoint of a first character and generating a first character view data stream;
recording scenes in the film from the viewpoint of a second character and generating a second character view data stream;
recording scenes in the film from the viewpoint of a third character and generating a third character view data stream;
time-synching the director's view data stream with the first, second, and third character view data stream and to create a perspective view data stream, the perspective view data stream allowing a user to switch at any time between the director's view version of the film and one or more of the first, second and third character view versions of the film during viewing of the film;
creating peripheral sensory device stream instructions, the peripheral sensory device stream instructions comprising instructions to actuate peripheral sensory devices;
creating informational data stream instructions, the informational stream instructions comprising messages for display in a message area on the viewing screen;
processing and time-synching the perspective view stream, peripheral sensory device stream instructions, and informational data stream instructions.

13. A method of claim 12, further comprising actuating one or more peripheral sensory devices during viewing of the film by a user.

14. The method of claim 12, further comprising displaying information in the message area on the viewing screen during viewing of the film by a user.

15. The method of claim 12, further comprising displaying on the screen a plurality of character icons, the character icons comprising a director's view icon and an icon for every character view available for viewing by the viewer at a current viewing time.

16. The method of claim 15, wherein a border around the character icons indicates which of the plurality of characters a viewer is viewing at the current viewing time.

17. The method of claim 12, further comprising displaying on the screen a character talking icon when a character whose perspective view the viewer is currently watching is talking.

18. The method of claim 12, further comprising displaying on the screen a character thinking icon when a character whose perspective view the viewer is currently watching is thinking.

19. The method of claim 12, further comprising displaying on the screen a character change alert indicator to indicate an imminent character change.

* * * * *